(12) United States Patent
Beer

(10) Patent No.: US 9,656,611 B1
(45) Date of Patent: May 23, 2017

(54) TRANSPORTABLE SKI RACK

(71) Applicant: Gadi Beer, Rydal, PA (US)

(72) Inventor: Gadi Beer, Rydal, PA (US)

(*) Notice: Subject to any disclaimer, the term of this patent is extended or adjusted under 35 U.S.C. 154(b) by 0 days.

(21) Appl. No.: 15/228,084

(22) Filed: Aug. 4, 2016

(51) Int. Cl.
| | |
|---|---|
| *B60R 9/12* | (2006.01) |
| *B60R 9/06* | (2006.01) |
| *B62B 3/10* | (2006.01) |
| *B62B 5/00* | (2006.01) |
| *B62B 5/06* | (2006.01) |
| *B62B 3/04* | (2006.01) |

(52) U.S. Cl.
CPC .................. *B60R 9/12* (2013.01); *B60R 9/06* (2013.01); *B62B 3/04* (2013.01); *B62B 3/102* (2013.01); *B62B 5/0003* (2013.01); *B62B 5/064* (2013.01)

(58) Field of Classification Search
CPC .... B60R 9/06; B60R 9/12; B62B 3/04; B62B 3/102; B62B 5/064
See application file for complete search history.

(56) References Cited

U.S. PATENT DOCUMENTS

| | | | |
|---|---|---|---|
| 6,869,097 B2 * | 3/2005 | Prather | B62B 3/027 280/33.996 |
| 8,800,788 B1 * | 8/2014 | Guidry | A01K 97/10 211/70.8 |

* cited by examiner

*Primary Examiner* — John Walters
*Assistant Examiner* — James Triggs
(74) *Attorney, Agent, or Firm* — Stuart M. Goldstein

(57) ABSTRACT

A transportable ski rack is configured to be both mounted directly on a vehicle or indirectly on a bicycle rack mounted on a vehicle and also be manually transported. The ski rack has forward and rear frame members, ski retaining brackets extending between and interconnecting the frame members, and wheels connected to both frame members. Dual handles are connected to the forward frame member, the handles being rotatable from a first position in which the handles extend outward for maintaining the ski rack in spaced relation to a vehicle when the ski rack is mounted on the vehicle and at least one of the handles extend outward for manually transporting the ski rack, to a second position in which both handles are rotatable towards the forward frame member for storage of the ski rack. A removeable storage box is located between the frame members.

9 Claims, 4 Drawing Sheets

TRANSPORTABLE SKI RACK

BACKGROUND OF THE INVENTION

There are a wide variety of ski supporting racks and carts presently in use. Most of these carriers accept and maintain skis for either stationary, temporary or long term storage, or they are designed solely to be manually pushed or pulled in order to move skis from a stored location to the ski slopes and back again. Certain ski racks are also configured to transport skis on vehicles by being mounted on the exterior of the vehicles. However, there are no current ski racks which are specifically designed both to carry a full complement of skis and also to be mounted on a vehicle. This permits the efficient and simple removal, from the vehicle, of the ski rack, which can then immediately be set on the ground and manually transported to the skiing site.

SUMMARY OF THE INVENTION

It is thus the object of the present invention to provide a transportable ski rack which overcomes the limitations and shortcomings of existing ski racks.

These and other objects are accomplished by the present invention, a transportable ski rack configured to be both mounted directly on a vehicle or indirectly on a bicycle rack mounted on a vehicle and also be manually transported. The ski rack comprises forward and rear frame members, ski retaining brackets extending between and interconnecting the frame members, and wheels connected to both frame members. Dual handles are connected to the forward frame member, the handles being rotatable from a first position in which the handles extend outward for maintaining the ski rack in spaced relation to a vehicle when the ski rack is mounted on the vehicle and at least one of the handles extend outward for manually transporting the ski rack, to a second position in which both handles are rotatable towards the forward frame member for storage of the ski rack. A removeable storage box is located between the frame members.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 2:
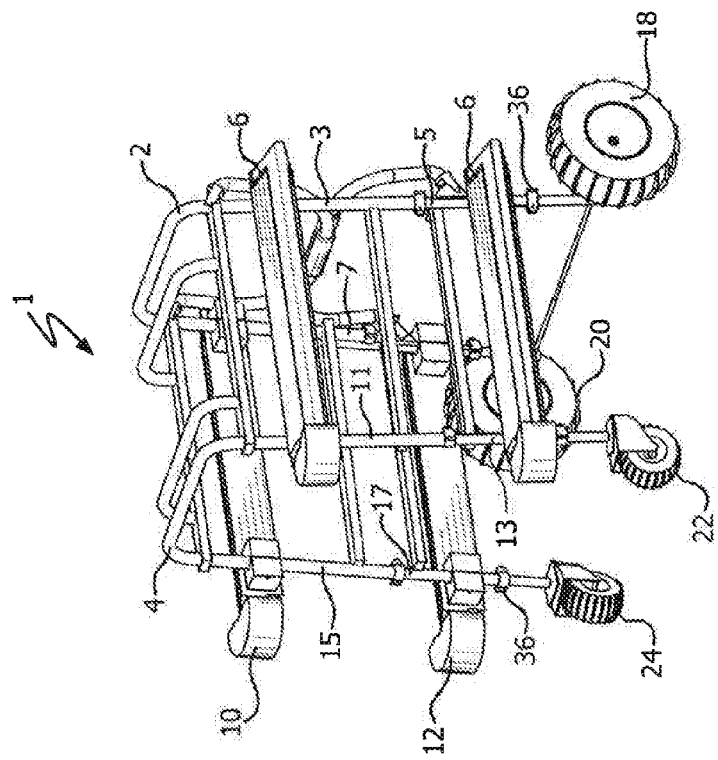
FIG. 2 is a perspective view of the ski rack of the present invention with its framing members in their storage position.

The transportable ski rack 1 of the present invention is configured to be easily, manually pulled and also mounted on a vehicle to be transported. Ski rack 1 is an integral rack comprising forward, inverted "U" shaped frame member 2, rear inverted "U" shaped frame member 4, and ski retaining brackets 6, 8, 10, and 12, extending between and interconnecting the forward and rear frame members.

Handles 14 and 16 are connected to forward frame member 2. Handles 14 and 16 are rotatable from a first position in which they extend outward for maintaining ski rack 1 in spaced relation to vehicle 50 on which it is mounted (see FIG. 5) and at least one of the handles extending outward to manually pull the ski rack (see FIGS. 3 and 4), to a second position in which the handles are rotatable from the first position towards forward frame member 2, such that the handles rest adjacent to the forward frame member, in order to accommodate storage of the ski rack (see FIG. 2). Wheels 18 and 20 are connected at the bottom of forward frame 2 and smaller wheels 22 and 24 are connected at the bottom of rear frame 4.

Figure 1:
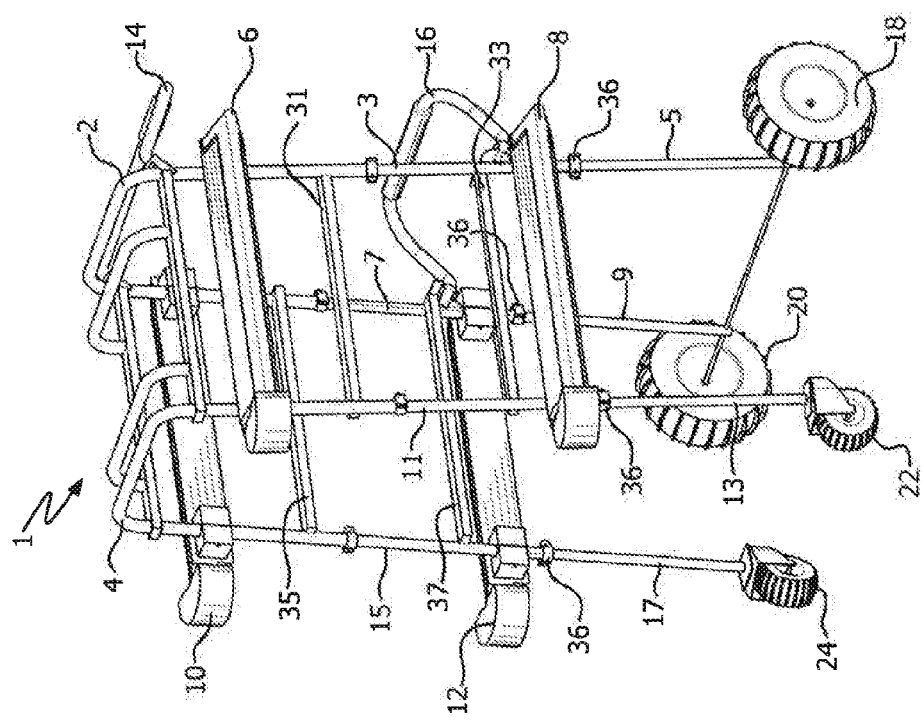
FIG. 1 is a perspective view of the ski rack of the present invention with its frame members in their use position.

FIG. 1 shows ski rack 1 set up for mounting skis 40. Handles 14 and 16 extend out to allow ski rack 1 to be manually pulled and moved to a desired location.

Figure 3:
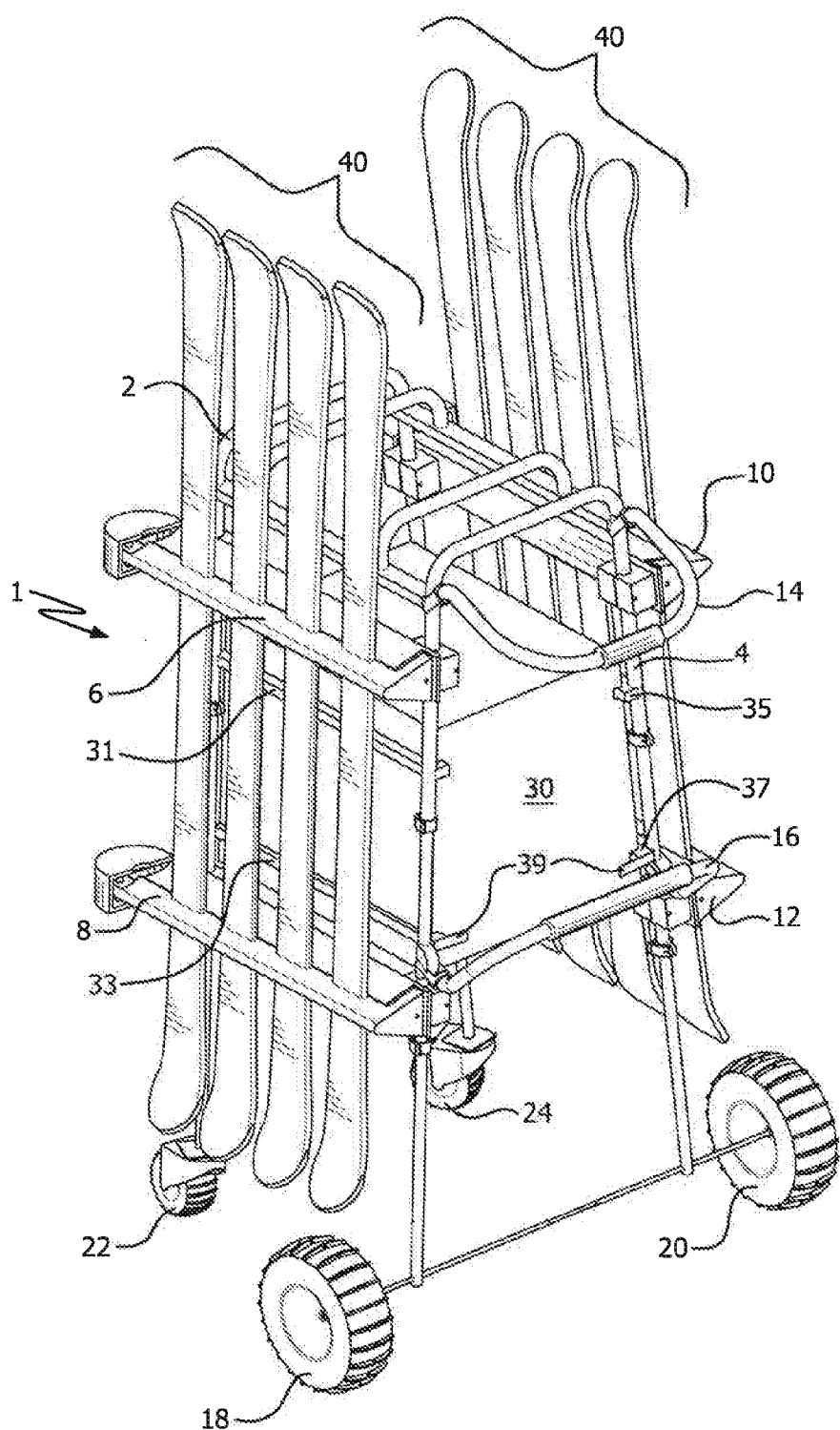
FIG. 3 is a front perspective view of the ski rack of the present invention with skis mounted thereon and a storage box mounted therein.
Figure 4:
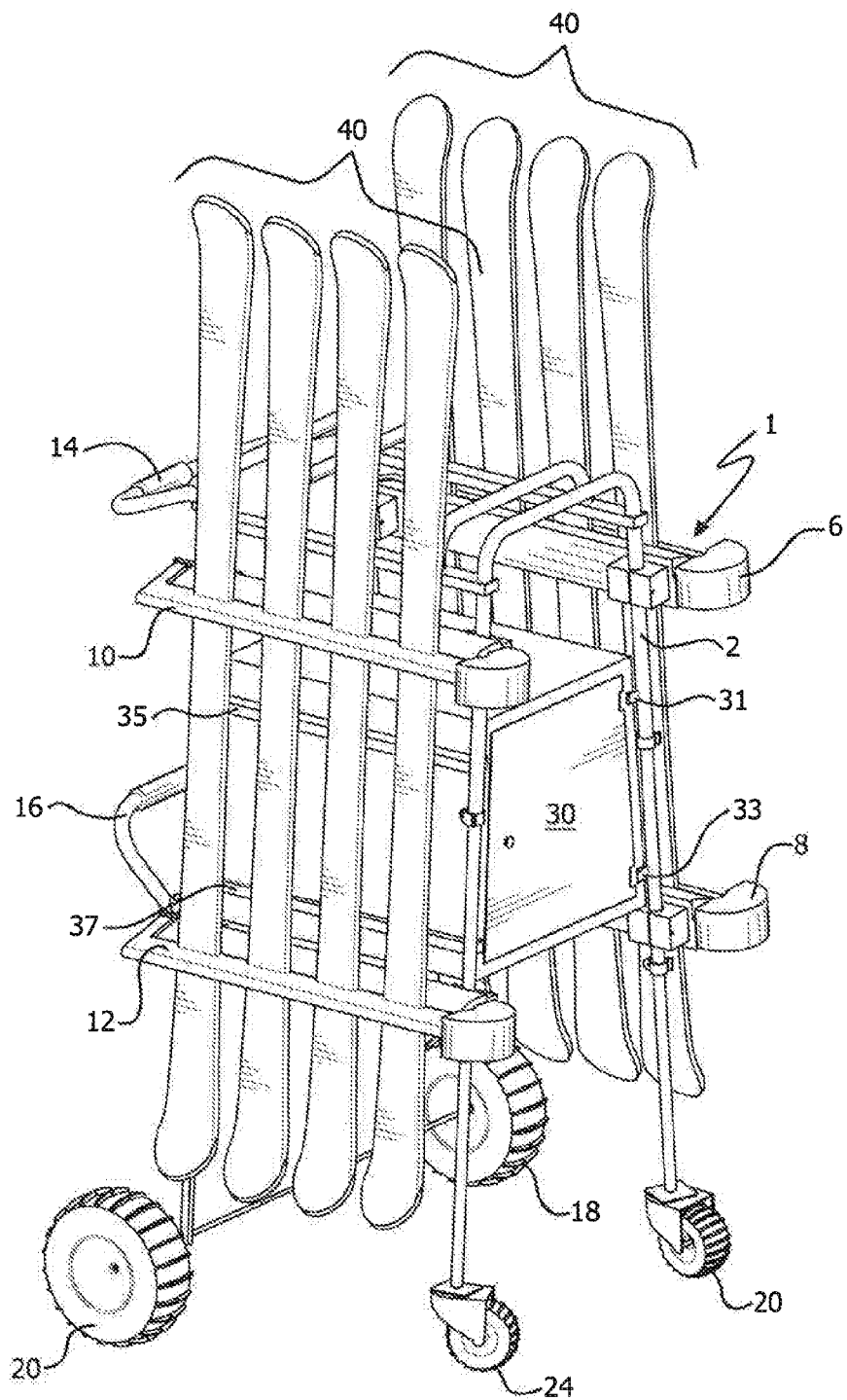
FIG. 4 is a rear perspective view of the ski rack of the present invention with skis mounted thereon and a storage box mounted therein.

FIGS. 3 and 4 show ski rack 1 with skis 40 mounted thereon through ski retaining brackets 6, 8, 10, and 12. Storage box 30, for the purpose of carrying and storing ski boots, clothing, and other ski accessories, is positioned between forward frame member 2 and rear frame member 4. Storage box 30 is held in position by rails 31, 33, 35, and 37 secured between frame members 2 and 4. The rails are configured to be inserted into slots within the side walls of storage box 30, to allow the storage box to be slid along the rails, between frame members 2 and 4. Stop elements 39 limit the rearward, sliding movement of storage box 30. The storage box can easily be slid out from between rails 31, 33, 35, and 37, in order to remove the box from frame members 2 and 4.

Figure 5:
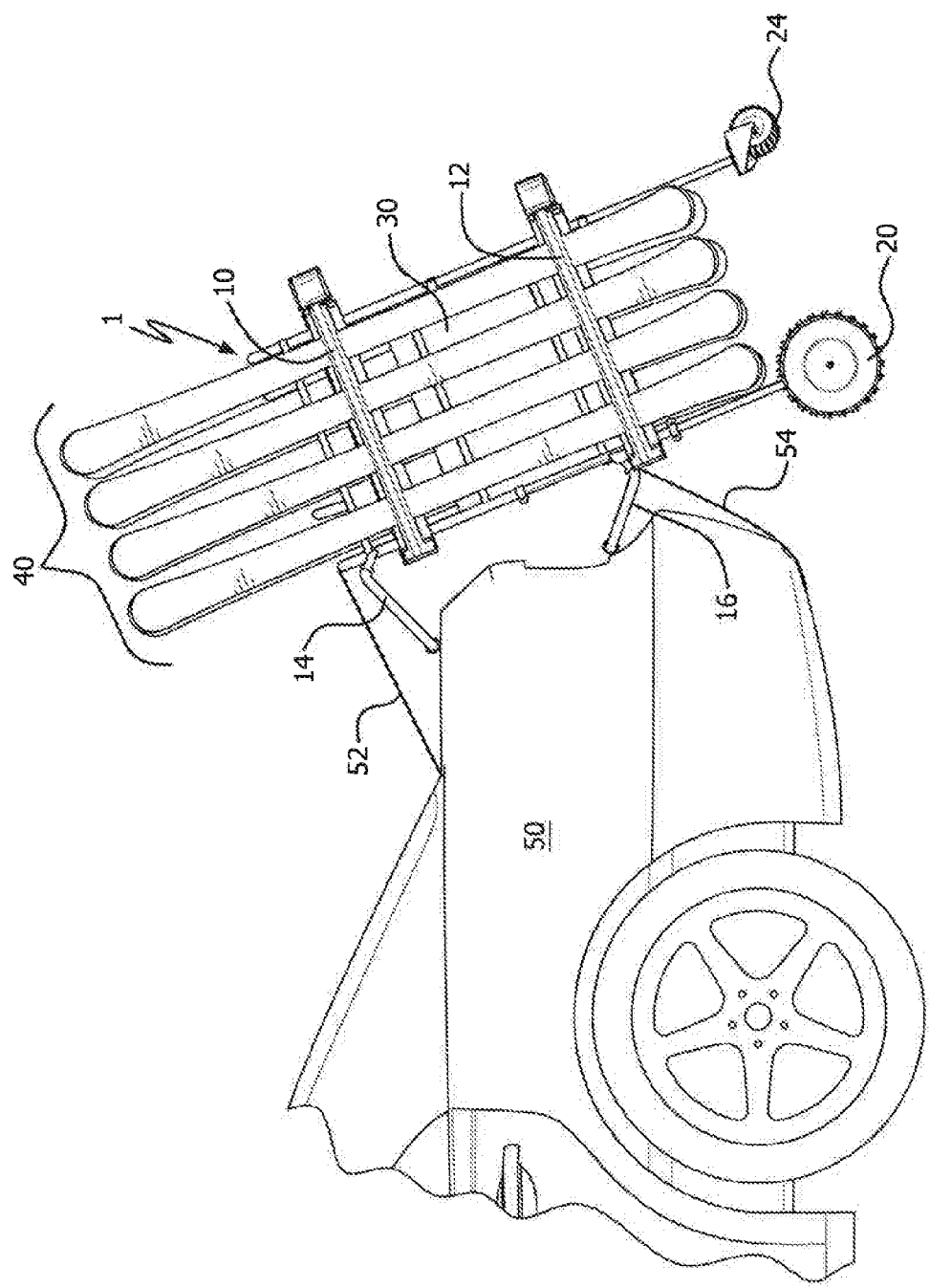
FIG. 5 is an elevation view of the ski rack of the present invention mounted for transport on a vehicle.

FIG. 5 shows ski rack 1 mounted directly to the back of vehicle 50. Attachment means, in the form of straps, bungee cords, or equivalent lines 52 and 54, secure forward frame 2 and hence ski rack 1 to vehicle 50 for vehicle transport. Ski rack 1 is also specifically configured to be mounted on a bicycle rack mounted on a vehicle. The unique design of the ski rack ensures its versatility in the manner it is transported.

FIG. 2 shows ski rack 1 in its retracted, storage position. Forward frame member 2 and rear frame member 4 each comprise telescoping elements 3, 5, 7, and 9 of forward frame member, and 11, 13, 15, and 17 of rear frame member. For storage purposes, elements 5 and 9 telescope within elements 3 and 7 and elements 13 and 17 telescope within elements 11 and 15. The elements are secured in these positions, as well as in their upright use positions, by adjustable clamps 36. Ski retaining brackets 6 and 10 are configured to slide down forward frame member 2 and rear frame member when ski rack 1 is to be stored. Adjustable clamps 36 also ensure brackets 6 and 10 are maintained in both their use and storage positions.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A transportable ski rack configured to be mounted on a vehicle, said rack comprising:
   a forward frame member;
   a rear frame member;

ski retaining brackets extending between and interconnecting the forward frame member and the rear frame member, said brackets protruding outwardly and away from the frame members;

wheels connected to both the forward frame member and the rear frame member; and first and second handles connected to the forward frame member, the first handle being attached at an upper section of the forward frame member and the second handle being attached substantially above the wheels, both handles being rotatable from a first position whereby the first handle rotates upward and away from the forward frame member and the second handle rotates downward and away from the forward frame member to extend outward for placement of the handles on a vehicle and for maintaining the ski rack in spaced relation to the vehicle when the ski rack is mounted on the vehicle, and whereby each of the two handles independently extend outward for manually pulling the ski rack, and are rotatable to a second position whereby the first handle is rotatable downward and towards the forward frame member and the second handle is rotatable upwards and towards the forward frame member for storage of the ski rack.

2. The transportable ski rack as in claim 1 wherein two wheels are located on the forward frame member and two wheels are located on the rear frame member.

3. The transportable ski rack as in claim 1 wherein upper and lower ski retaining brackets extend between and interconnect a first side of both the forward frame member and the rear frame member and upper and lower ski retaining brackets extend between and interconnect a second side of both the forward frame member and the rear frame member.

4. The transportable ski rack as in claim 3 wherein the upper ski retaining brackets are vertically slideable along the forward frame member and the rear frame member.

5. The transportable ski rack as in claim 1 further comprising a storage box located between the forward frame member and the rear frame member.

6. The transportable ski rack as in claim 5 wherein upper and lower ski retaining brackets extend between and interconnect a first side of both the forward frame member and the rear frame member and upper and lower ski retaining brackets extend between and interconnect the second side of both the forward frame member and the rear frame member.

7. The transportable ski rack as in claim 6 wherein the upper ski retaining brackets are vertically slideable along the forward frame member and the rear frame member.

8. The transportable ski rack as in claim 1 wherein the forward frame member and the rear frame member are "U" shaped in configuration.

9. The transportable ski rack as in claim 1 further comprising attachment means extending outward from the forward frame member to secure the forward frame member and the rear frame member to a vehicle.

* * * * *